US009069666B2

(12) United States Patent
Hawkins et al.

(10) Patent No.: US 9,069,666 B2
(45) Date of Patent: Jun. 30, 2015

(54) SYSTEMS AND METHODS FOR CONTROLLING ERROR REPORTING AND RESOLUTION

(75) Inventors: Joshua Hawkins, Ft. Collins, CO (US); William Brothers, Roseville, CA (US); Phil A. Flocken, Ft. Collins, CO (US); Jay Shaughnessy, Mt. Laurel, NJ (US); Travis Scott Tripp, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2472 days.

(21) Appl. No.: 11/377,755

(22) Filed: Mar. 15, 2006

(65) Prior Publication Data
US 2006/0242286 A1     Oct. 26, 2006

Related U.S. Application Data

(63) Continuation-in-part of application No. 10/442,592, filed on May 21, 2003.

(51) Int. Cl.
  *G06F 15/173*     (2006.01)
  *G06F 11/00*      (2006.01)
  *G06F 11/07*      (2006.01)
  *G06F 11/22*      (2006.01)

(52) U.S. Cl.
  CPC ........ *G06F 11/0769* (2013.01); *G06F 11/0748* (2013.01); *G06F 11/0709* (2013.01); *G06F 11/0781* (2013.01); *G06F 11/2294* (2013.01)
  USPC .......................................... 709/223; 714/100

(58) Field of Classification Search
  None
  See application file for complete search history.

(56) References Cited

U.S. PATENT DOCUMENTS

| 5,119,377 A | 6/1992 | Cobb |
| 5,621,663 A | 4/1997 | Skagerling |
| 5,678,002 A | 10/1997 | Fawcett |
| 6,230,287 B1 | 5/2001 | Pinard et al. |
| 6,237,114 B1 * | 5/2001 | Wookey et al. ................. 714/47 |
| 6,260,048 B1 | 7/2001 | Carpenter et al. |
| 6,263,457 B1 | 7/2001 | Anderson |
| 6,356,909 B1 | 3/2002 | Spencer |
| 6,460,070 B1 | 10/2002 | Turek et al. |
| 6,480,972 B1 | 11/2002 | Cromer et al. |
| 6,516,427 B1 | 2/2003 | Keyes |
| 6,539,499 B1 | 3/2003 | Stedman et al. |
| 6,587,836 B1 | 7/2003 | Ahlberg |
| 6,658,586 B1 | 12/2003 | Levi |
| 6,714,916 B1 | 3/2004 | Robertson et al. |

(Continued)

FOREIGN PATENT DOCUMENTS

| DE | 195 32 929 A1 | 4/1997 |
| DE | 19532929 | 4/1997 |

(Continued)

OTHER PUBLICATIONS

International Search Report and Written Opinion dated Sep. 19, 2007.

*Primary Examiner* — Ranodhi Serrao
(74) *Attorney, Agent, or Firm* — Olympic Patent Works PLLC (57) ABSTRACT

Various system and method embodiments are disclosed that include using a first node to receive messages including error information from a plurality of client computers via a computer network. Recommendations for resolving errors associated with the error information are made available to the client computers via the computer network.

20 Claims, 3 Drawing Sheets

(56) References Cited

U.S. PATENT DOCUMENTS

| | | |
|---|---|---|
| 6,714,976 B1 | 3/2004 | Wilson et al. |
| 6,718,482 B2 | 4/2004 | Sato et al. |
| 6,725,398 B1 | 4/2004 | Varma et al. |
| 6,836,773 B2 | 12/2004 | Tamayo et al. |
| 6,865,691 B1 | 3/2005 | Brundridge et al. |
| 6,892,317 B1* | 5/2005 | Sampath et al. .................. 714/4 |
| 6,907,551 B2 | 6/2005 | Katagiri et al. |
| 6,944,659 B2 | 9/2005 | Taggart et al. |
| 6,981,039 B2 | 12/2005 | Cerami |
| 7,120,819 B1 | 10/2006 | Gurer et al. |
| 7,260,597 B1 | 8/2007 | Hofrichter |
| 2002/0019870 A1* | 2/2002 | Chirashnya et al. .......... 709/224 |
| 2002/0173997 A1 | 11/2002 | Menard et al. |
| 2002/0194320 A1 | 12/2002 | Collins |
| 2002/0194550 A1 | 12/2002 | Lopke |
| 2002/0198984 A1* | 12/2002 | Goldstein et al. ............. 709/224 |
| 2003/0009710 A1 | 1/2003 | Grant |
| 2003/0033397 A1 | 2/2003 | Gurumoorthy |
| 2003/0033545 A1 | 2/2003 | Wenishch et al. |
| 2003/0056140 A1 | 3/2003 | Taylor et al. |
| 2003/0097617 A1* | 5/2003 | Goeller et al. .................. 714/39 |
| 2004/0090450 A1 | 5/2004 | Gill et al. |
| 2004/0123153 A1 | 6/2004 | Wright et al. |
| 2004/0123188 A1 | 6/2004 | Srinivasan et al. |
| 2004/0128583 A1 | 7/2004 | Iulo |
| 2004/0128585 A1 | 7/2004 | Hind et al. |
| 2004/0153764 A1 | 8/2004 | Paradkar |
| 2004/0153823 A1 | 8/2004 | Ansari |
| 2004/0236843 A1 | 11/2004 | Wing et al. |
| 2005/0182879 A1* | 8/2005 | Vu ................................ 710/260 |
| 2005/0187940 A1* | 8/2005 | Lora et al. ...................... 707/10 |
| 2005/0198556 A1 | 9/2005 | Tripp et al. |
| 2006/0150159 A1* | 7/2006 | Fellenstein et al. ........... 717/126 |
| 2006/0195727 A1* | 8/2006 | Yoshitsugu et al. ........... 714/38 |

FOREIGN PATENT DOCUMENTS

| | | |
|---|---|---|
| EP | 1109101 | 6/2001 |
| EP | 1195681 | 4/2002 |
| WO | WO-9715009 | 4/1997 |
| WO | WO-01/46824 | 6/2001 |
| WO | WO-0241105 | 5/2002 |
| WO | WO-03019377 | 3/2003 |

* cited by examiner

SYSTEMS AND METHODS FOR CONTROLLING ERROR REPORTING AND RESOLUTION

RELATED APPLICATIONS

This application is a continuation-in-part of U.S. patent application Ser. No. 10/442,592 entitled "Computer Service Using Automated Local Diagnostic Data Collection and Automated Remote Analysis" filed May 21, 2003, which is owned by the same assignee as the present disclosure and is hereby incorporated by reference.

BACKGROUND

Software programs can be quite complex in part because of their intended functionality, and in part due to a requirement to run on a variety of hardware configurations and along with a variety of other software programs. Due to the complexity, software faults resulting in a program aborting or entering a non-responsive state, can occur more frequently than desired. Due to increasing dependence on computers, it is desirable to minimize the occurrence of faults and provide recommendations for resolving the problem to the user.

Many programs and operating systems now provide error messages when a program aborts or runs erratically. In some cases, the messages simply inform the user that an error has occurred, while other software products provide at least some information about the error.

In many cases, the user must contact a vendor's technical support personnel to solve a software problem. Often a customer must wait for access to technical support personnel. It is often difficult for technical support personnel to acquire the information relevant to solving a problem from a user. Finally, it can be difficult for a technical support person to use available information to suggest a possible solution.

To reduce costs, many vendors provide automated help in the form of a fax-back service or a web site or both. Often, a menu system helps a user identify a problem from a list and the service then provides a recommended course of action for the user. While such automated systems can reduce costs to the vendor, it is often difficult and time consuming to find relevant information. Also, the number of possible configurations that can be considered by menu-driven systems is limited.

SUMMARY

In some embodiments, a computer product is provided that includes logic instructions operable in a first node to receive messages including error information from a plurality of client computers via a computer network. The logic instructions further transmit messages to the client computers via the computer network, wherein the messages indicate availability of recommendations for resolving errors reported with the error information.

BRIEF DESCRIPTION OF THE DRAWINGS

The accompanying drawings, which are incorporated in and form a part of this specification, illustrate embodiments of the invention and, together with the description, serve to explain its principles.

DETAILED DESCRIPTION OF THE DRAWINGS

Figure 1:
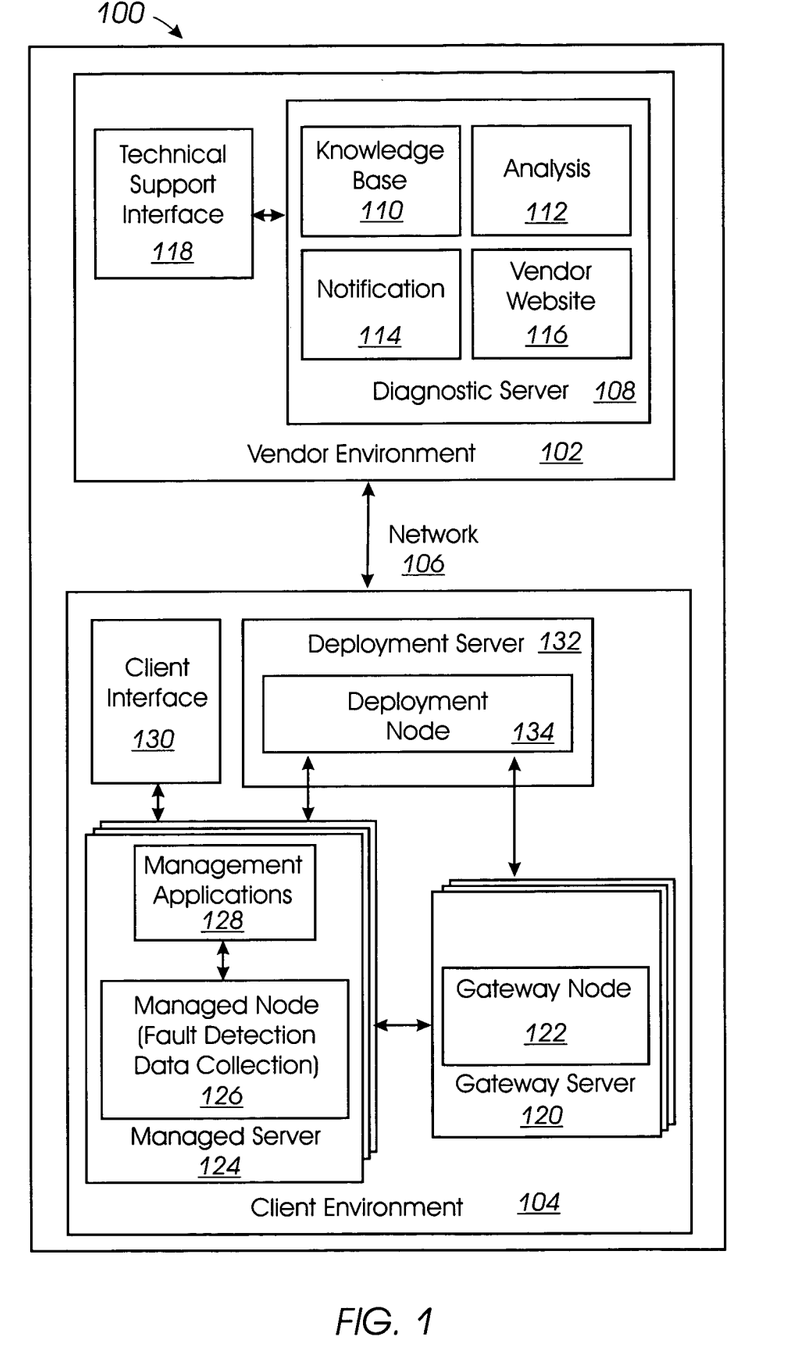
FIG. 1 shows an embodiment of a system including a vendor environment configured to receive error information from client environment and provide automated error recovery information to client environment via a network.

Referring to FIG. 1, an embodiment of a system 100 is shown including a vendor environment 102 configured to receive error information from client environment 104 and provide automated error recovery information to client environment 104 via network 106. Vendor environment 102 can include diagnostic server 108 with knowledge base 110, analysis module 112, notification module 114, and vendor website 116. Vendor environment 102 can also include technical support interface 118. Client environment 104 can include one or more gateway server(s) 120 with gateway node 122, managed server(s) 124 with managed node 126 and management application(s) 128, deployment server 132 with deployment node 134, and client interface(s) 130.

Client environment 104 can include multiple gateway nodes 122 that send fault data from managed nodes 126 to diagnostic server 108. Gateway nodes 122 can maintain a threshold counter that will cause the gateway node 122 to stop accepting fault data when an event storm is detected. The term "event storm" as used herein refers to a predetermined number of fault events being detected within a specified time period. In conventional systems, increased traffic due to communication between gateway nodes 122 and diagnostic servers 108 during an event storm can exacerbate existing problems and cause further problems. By discontinuing acceptance and transfer of fault data, an event storm is prevented from propagating to diagnostic server 108 from the particular gateway node 122. Managed node 126 will attempt to submit the incident to one of the remaining gateway nodes 122 however.

To help prevent the event storm from continuing until all of gateway nodes 122 have independently detected the event storm and shutdown, a gateway node 122 that detects an event storm can send a message to deployment node that the gateway node 122 has detected an event storm from a particular managed node 126. Deployment node 134 can then send a message to remaining gateway nodes 122 indicating the occurrence of an event storm. In some embodiments, gateway nodes 122 can discontinue transmitting fault data from the managed node 126 where the event storm was first detected. In other embodiments, gateway nodes 122 can discontinue transmitting fault data from all managed nodes 126. Any gateway nodes 122 that are not configured to receive messages from deployment node 134 can continue using their internal threshold limits to detect the presence of an event storm.

With further regard to components in vendor environment 102, knowledge base 110 can include information regarding possible causes and remedies for various errors to help users resolve problems with applications 128. Users can access knowledge base 110 over a network communication link via client interface 130.

Technical support interface 130 can be implemented to receive input from a user, convey a request to diagnostic server 108, and provide responsive information from diagnostic server 108 to the user via a suitable method, such as a browser display, and/or audio input/output using voice recognition and text to speech capabilities.

Knowledge base 110 can be continually updated as a result of on-going vendor evaluation of software and events reported by different clients. In some embodiments, knowledge base 110 is implemented as an unstructured object-oriented database. Alternatively, a native database, a relational database, or other suitable database or data structure can be used.

Analysis module 112 can receive error/diagnostic information from a managed node 126, automatically analyze the collected data, and offer troubleshooting and solution suggestions for a detected fault. In some embodiments, artificial intelligence algorithms can be used in analysis module 112 to identify the cause of the fault and recommend a course of action to client. The recommended course of action can be posted on vendor website 116.

Notification module 114 can transmit notice to client interface 130 that the recommendation is posted along with directions for the user to access the recommendation. For security and confidentiality reasons, vendor website 116 can include features that authenticate users attempting to view specific recommendations. In addition, vendor website 116 may allow open access to non-specific troubleshooting information.

In some embodiments, if a user is unable or unwilling to use a recommendation generated by analysis module 112, the user can select an option on an analysis report via client interface 130 to automatically convert the fault data into a workflow case and engage technical support personnel. The support personnel can access the analysis report and recommendations via technical support interface 118. A browser program such as Internet Explorer by Microsoft Corporation or other suitable interface display can be used as technical support interface 118.

The analysis report generated by analysis module 112 can also include a feedback section to gather information concerning the usefulness of the recommendations from the user. Trends in the feedback information from users can be analyzed to automatically adjust, also referred to "train," the artificial intelligence modules in analysis module 112.

With further regard to components in client environment 104, deployment node 132 can be configured to manage the configuration of managed nodes 126 and gateway nodes 122. The configuration can include setting user contacts for email notification, activating a support contract and/or setting parameters to allow gateway nodes 122 and managed nodes 126 access to diagnostic server 108, and other suitable configuration features. The configuration information can be broadcast to gateway nodes 122 and managed nodes 126 from deployment node 132, as required.

Managed nodes 126 detect faults in management applications 128 and collect context-specific information about the faults. Managed servers 124 are not required to have network access, since a managed node 126 will typically forward fault data to a gateway node 122 for subsequent transfer to diagnostic server 108. In some embodiments, diagnostic server 108 and gateway nodes 122 communicate in a secure manner, such as by using encrypted data, transmitting over a secure port, or other suitable means for secure communication.

Gateway nodes 122 send the fault data to diagnostic server 108, and therefore typically, but not necessarily, reside on gateway servers 120 with network access.

Client interface 130 can be implemented to receive input from a user, convey a request to diagnostic server 108, and receive and display responsive information from vendor environment 102. Any suitable interface device or method can be used, such as a browser display, and/or audio input/output using voice recognition and text to speech capabilities.

The recommendations may be intended to solve a problem. Alternatively, the recommendations may simply direct the user to other sources of information that may prove helpful. Additionally, an analysis report may provide information regarding the cause of the fault.

Figure 2:
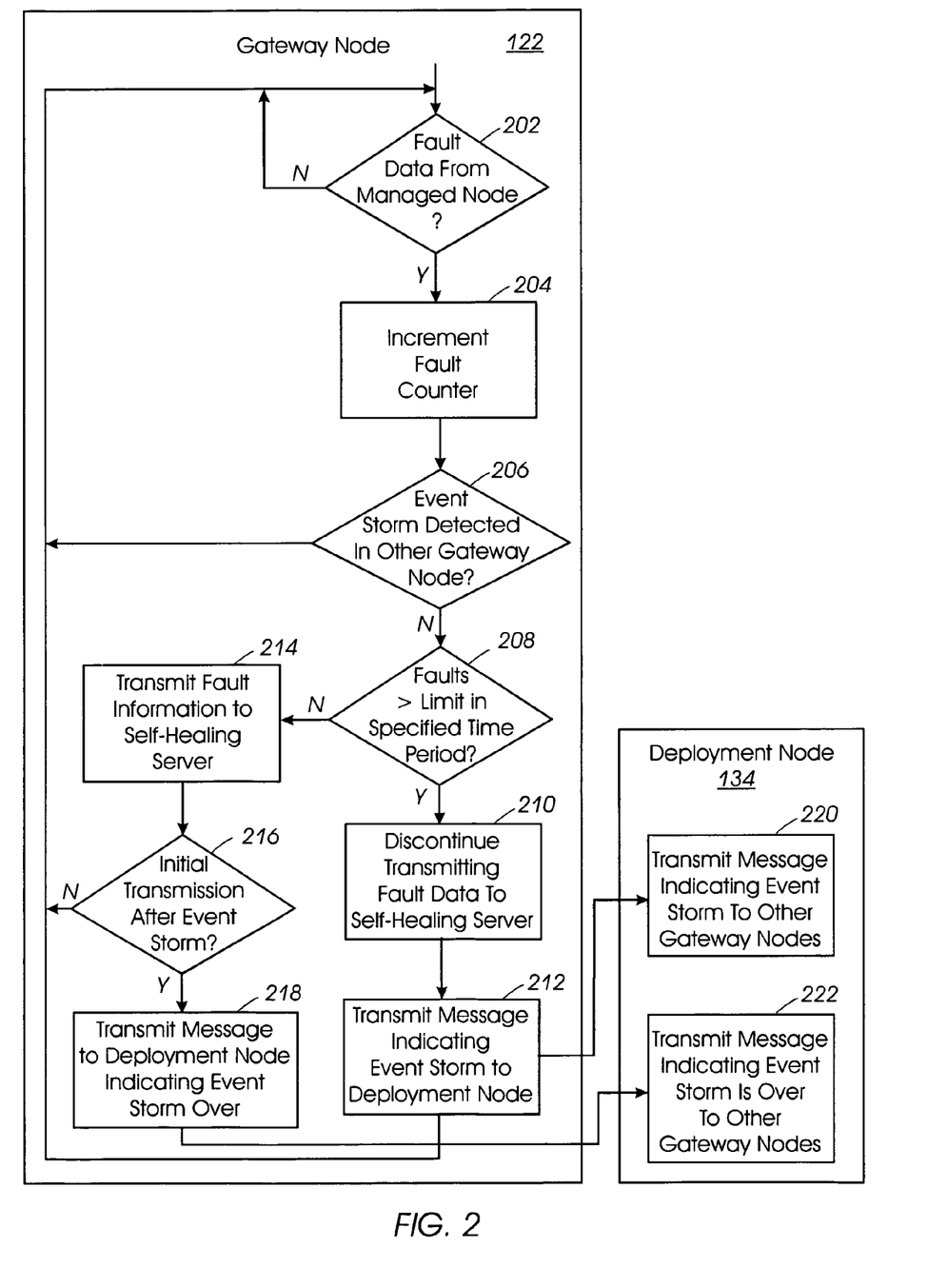
FIG. 2 shows an embodiment of processes performed in gateway nodes and deployment nodes are shown.

Referring to FIGS. 1 and 2, an embodiment of processes performed in gateway nodes 122 and deployment nodes 134 are shown. In gateway node 122, process 202 determines whether fault data has been sent from a managed node 126. If so, process 204 increments a fault counter to determine the number of faults detected since the counter was last reset. Process 206 can be included to determine whether an event storm has been detected in any other gateway nodes 122. If so, gateway node 122 can enter a state where fault data is not forwarded to diagnostic server 108 to further mitigate problems that may be caused by an event storm. Accordingly, process 206 can transfer control back to process 202 to monitor fault data. Note that when the event storm on another gateway node 122 clears, process 206 will transfer control to process 208.

Process 208 determines whether the number of faults detected has exceeded a predetermined limit within a specified period of time. If so, process 210 discontinues transmitting the fault data to diagnostic server 108, and process 212 transmits a message to deployment node 134 indicating that an event storm has been detected on the particular gateway node 122. When deployment node 134 receives the event storm message from gateway node 122, process 220 in deployment node 134 communicates a message to other gateway nodes 122 in client environment 102 indicating the presence of the event storm.

Gateway node 122 can resume transferring fault data when the number of faults detected with a specified time period is within the predetermined limit. Referring again to process 208, if the number of faults detected has not exceeded a predetermined limit within a specified period of time, process 214 communicates the fault data to diagnostic server 108. Process 216 determines whether gateway node 122 is initially resuming transfers of fault data, and if so, process 216 can transmit an "all-clear" message to deployment node 134 indicating that the event storm is over. When deployment node 134 receives the all-clear message, process 222 in deployment node 134 can transmit an all clear message to the other gateway nodes 122 indicating that the event storm is over.

Figure 3:
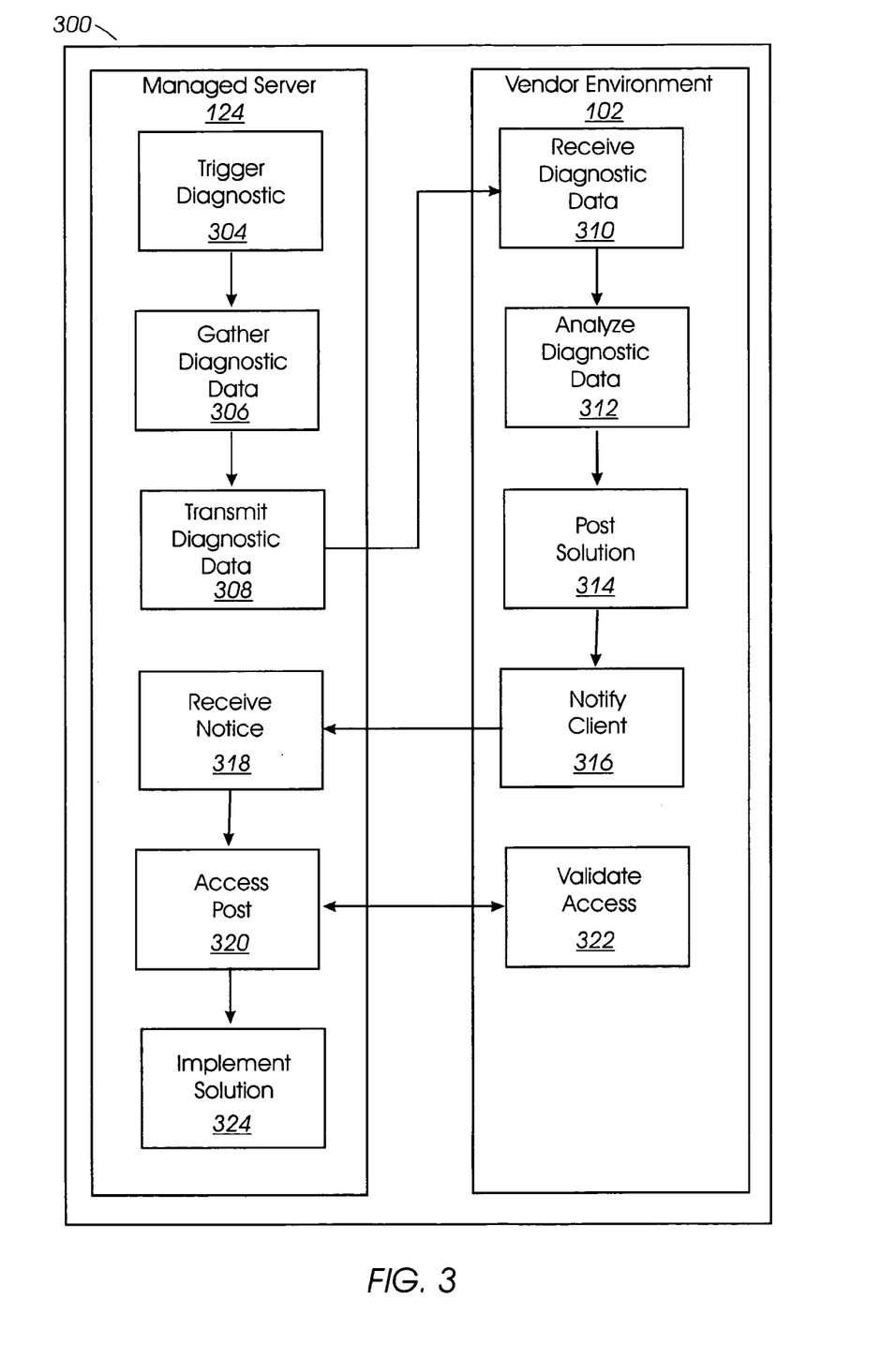
FIG. 3 shows an embodiment of a process that can be initiated when a management application suffers a software fault or error while running on managed server.

Referring to FIGS. 1 and 3, process 300 can be initiated on managed server 124 and vendor environment 102 when a management application 128 suffers a software fault or error while running on managed server 124, in accordance with an embodiment. In process 304, the fault is detected and, in response, a managed node 126 is launched. In process 306, managed node 126 gathers relevant fault data such as the nature of application 128, nature of the fault, and the overall software and hardware configuration of the computer on which the fault occurred. In process 308, the collected fault data is transmitted to vendor environment 102 over the network, such as the Internet or other suitable communication network.

In process 310, vendor environment 102 receives the diagnostic data. In process 312, analysis module 112 running on vendor environment 102 analyzes the collected data to identify the cause of the fault and information from knowledge base 110 to recommend a course of action via client interface 130. Once a recommendation is determined, the recommendation can be posted for access via vendor website 116 or other suitable location in process 314. In process 316, vendor environment 102 transmits notice to client environment 104 that the recommendations are posted and provides directions for accessing the recommendations.

Client environment 104 receives the notice in process 318, enabling a user to access vendor website 116 in process 320. To secure the information from unauthorized access, website 116 can implement an authorization/validation procedure in process 322. Once validation is complete, a user can access the recommendations in process 324 via client interface 130.

Process 300 can provide for variations of trigger process 304. In some embodiments, the data-collection software can be integrated with management applications 128 so that process 304 can automatically invoke a managed node 126 when specific fault(s) occur. Managed node 126 can provide a graphic user interface (GUI) to enable a user to trigger data collection manually and directly submit information regarding the fault. Alternatively, an accessory application (not shown) can be running concurrently to detect the software fault, and collect and transmit fault data.

Process 306 can be configured to collect data when the fault occurs to ensure the information gathered is up to date. Partial or complete data can be collected prior to detection of a fault. For example, if the data-collection software is run concurrently with the accessory application the data-collection software can gather data in advance and only send data when an error or other event is detected. Also, data can be collected in advance and used unless there is an indication, e.g., in register dates, that some of the data may have changed since collection.

The data collected can include information about the client system, including kernel or registry settings and the applications and processes that are resident on the system. The data can also include information about application 128, for example, error log files, patch information, configuration files, and context-specific information about the fault that is generated by application 128. Managed node 126 can also include a configuration file that contains client-specific information such as a client identification handle and the email address for a specific contact person of client. In addition, managed node 126 can include a policy file to allow client environment 104 to control which data is collected and transmitted.

In data transmit process 308, the collected data can be transmitted directly if the computer running application 128 is connected to the network. Alternatively, the data can be routed to another computer on the client network that is connected to the network. In either case, a policy file can be used to permit or require manual intervention by a user before transmitting diagnostic data over the network. Any suitable communication protocol can be used.

Data can be received in vendor environment 102 by one or more agents and/or an application server. Vendor environment 102 is capable of handling multiple fault data downloads concurrently from the same or different client environments 104.

Analysis module 112, used in process 312, receives the data collected in process 302. Analysis module 112 may generate statistical data, be based on machine learning techniques, include an artificial intelligence rule-based/case-based expert system, or any combination thereof. Analysis module 112 can also include capabilities to analyze the context in which the fault occurred to determine whether management application 128 is incompatible with an operating system or with another management application 128.

In some embodiments, analysis module 112 processes the fault data to identify a problem and apply context-specific analysis tools such as a software patch analysis tool or a system analysis tool. Analysis module 112 can also apply general content collection tools, such as automatically searching through vendor's support solution documents, online manuals, private and public user forum logs, technical support workflow system case logs, defect tracking systems, internal and external support website search engines, and other suitable resources.

In addition, analysis module 112 can apply trend analysis to the fault data to generate high-level trouble-shooting or solution information. Optionally, machine-learning software such as a neural network and/or support vector machine can be used to generate further generalizations. To accommodate different human languages, analysis software can provide dynamic translation of incoming diagnostic data and of outgoing recommendations, as needed.

An analysis report, including recommendations, can be stored in knowledge base 110 and posted on a protected area of vendor website 116 in process 314. The recommendations can involve either or both of human readable recommendations and files to be downloaded to the user. The files can be "read me" files, executable files, configuration files, or other suitable format. Information regarding the fault can also be tied to specific troubleshooting comments in a technical support database to provide additional context-specific information.

Notification processes 316 and 318 can include sending an e-mail to a contact person. The contact can be an Information Technology expert person or group of people at client. Typically, the email address to which the notice is sent is stored in a configuration file in client environment 104. Alternatively, this information can be stored on a client information base on vendor environment 102. In some embodiments, the email identifies a uniform resource locator (URL) that leads to the recommendations posted in process 314. Alternatively, notification can be provided to a personal-digital-assistant, cell phone, or other suitable device. Client policies may additionally be used to dictate how and when notice is provided.

Access and validation occur in processes 320 and 322. In some embodiments, a URL is provided that allows access without validation. A link is provided to the actual site at which the recommendation is made. However, accessing the link triggers a request for customer identification information. The identification information is required before the recommendation can be accessed to prevent competitors and other unauthorized parties from gaining knowledge of faults occurring in client environment 104.

The user can implement recommendations in process 324, which typically includes following a set of instructions. The instructions may include downloading files to the client computer. The files may include updates, patches, further instructions, etc. If a patch is installed automatically, the client will receive notification regarding the specific action taken Embodiments of client environment 104 and vendor environment 102 disclosed herein may be implemented using a variety of computer system configurations such as servers, personal computers, hand-held devices, multi-processor systems, microprocessor-based or programmable consumer electronics, network PCs, network adapters, minicomputers, mainframe computers and the like. Embodiments of the invention may also be practiced in distributed computing environments, where tasks are performed by remote processing devices that are linked through a communications network. In a distributed computing environment, program modules may be located in both local and remote memory storage devices. Additionally, some embodiments may be implemented as logic instructions and distributed on computer readable media or via electronic signals.

The computer systems can include any number of processors coupled to one or more memory devices including primary storage devices such as a random access memory (RAM), and read only memory (ROM). A specific primary storage device such as a CD drive may also pass data unidirectionally to the processor.

Client environment 104 and vendor environment 102 can also be coupled to one or more input/output devices that may include, but are not limited to, devices such as printers, video monitors, track balls, mice, keyboards, microphones, touch-sensitive displays, transducer card readers, magnetic and optical media readers and writers, tablets, styluses, voice or handwriting recognition systems, and/or other suitable types of devices. Client environment 104 and vendor environment 102 optionally may be coupled to a computer or telecommunications network, e.g., a local area network and/or a wide area network such as the Internet, through a network interface. With such a network connection, Client environment 104 and vendor environment 102 can receive information from the network, or output information to the network. Such information, which can be represented as a sequence of computer executable instructions, may be received from and output to the network, for example, in the form of a computer data signal embodied in a carrier wave during transmission across the network.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. A computer product comprising:
   first logic instructions on a non-transitory computer readable storage device media operable in a first node to:
      receive first messages including error information from a plurality of client computers via a computer network;
      transmit second messages to the client computers via the computer network, wherein the second messages indicate availability of recommendations for resolving errors reported with the error information;
      discontinue accepting the first messages when the number of the first messages received from at least one of the client computers exceeds a limit within a specified time period; and
      communicate to a second node that the first node has discontinued accepting the first messages from the client computer.

2. The computer product of claim 1, wherein:
   the first logic instructions are further operable to:
      count the number of the first messages received from the client computers within a specified time period.

3. The computer product of claim 2, wherein:
   the first logic instructions are further operable to:
      transmit the first messages from the node to a diagnostic computer.

4. The computer product of claim 3, wherein:
   the first logic instructions are further operable to:
      discontinue transmitting the first messages to the diagnostic computer when the number of messages received from the client computer exceeds a limit within the specified time period to prevent an event storm from propagating from the first node to the diagnostic computer.

5. The computer product of claim 1, further comprising:
   second logic instructions operable to:
      receive messages indicating that a first server has discontinued accepting the first messages from the client computer; and
      notify other client computers that the first node has discontinued accepting the first messages.

6. The computer product of claim 5, wherein:
   the second logic instructions are further operable to:
      receive messages indicating that an event storm is over; and
      notify the other client computers that the event storm is over.

7. The computer product of claim 1, further comprising:
   a processor configured to execute the first logic instructions.

8. A method comprising:
   transmitting fault data from at least one computer system executing an application program to a diagnostic server;
   determining whether a number of fault events detected by the diagnostic server exceeds a limit;
   transmitting an event storm message to a second node when the number of fault events exceeds the limit;
   broadcasting the event storm message from the second node to other computer systems;
   transmitting the fault data to the diagnostic server when the number of fault events is within the limit; and
   discontinuing transmitting the fault data to the diagnostic server when the number of fault events exceeds the limit.

9. The method of claim 8, further comprising:
   transmitting a message indicating an event storm is over to the second node.

10. The method of claim 9, further comprising:
    transmitting the message indicating the event storm is over from the second node to the computer systems other than the at least one computer system.

11. The method of claim 8, further comprising:
    analyzing the fault data in the diagnostic server;
    generating recommendations to resolve a fault associated with the fault data; and
    posting the recommendations in a location accessible by a user of the at least one computer system.

12. A computer product comprising:
    logic instructions on a non-transitory computer readable storage device media operable to:
       collect fault data when faults occur in application programs executing on a first computer system;
       determine when an event storm occurs based on the number of faults in a specified time period;
       transmit the fault data to a diagnostic server until the event storm occurs;

transmit a message indicating the occurrence of the event storm to a first node;
notify a second node of the event storm from the first node; and
notify other computer systems executing application programs of the event storm from the second node.

13. The computer product of claim 12, wherein:
the other computer systems discontinue transmitting fault data upon being notified of the event storm.

14. The computer product of claim 12, further comprising:
second logic instructions operable to:
receive recommendations for resolving the fault via a client interface.

15. The computer product of claim 12, further comprising:
second logic instructions operable to:
notify the other computer systems when the event storm is over, wherein the first computer system and the other computer systems resume transmitting the fault data when the event storm is over.

16. The computer product of claim 12, wherein:
the first node is configured to receive messages indicating the occurrence of event storms from the other computer systems as well as the first computer system.

17. An apparatus comprising:
means for communicating fault data from at least one computer system executing an application program to a diagnostic node;
means for communicating an event storm message to a second node when a number of fault events exceeds a limit;
means for broadcasting the event storm message from the second node to other computer systems executing application programs; and
means for discontinuing communicating the fault data to the diagnostic node when the number of fault events exceeds the limit.

18. The apparatus of claim 17, further comprising:
means for indicating an event storm is over from the diagnostic node to the second node.

19. The method of claim 17, further comprising:
means for indicating the event storm is over.

20. The method of claim 17, further comprising:
means for analyzing the fault data in the diagnostic node;
means for generating recommendations to resolve a fault associated with the fault data; and
means for communicating the recommendations to a user.

* * * * *

UNITED STATES PATENT AND TRADEMARK OFFICE
CERTIFICATE OF CORRECTION

PATENT NO.        : 9,069,666 B2                                    Page 1 of 1
APPLICATION NO.   : 11/377755
DATED             : June 30, 2015
INVENTOR(S)       : Hawkins et al.

It is certified that error appears in the above-identified patent and that said Letters Patent is hereby corrected as shown below:

In the claims

Column 10, line 16, Claim 19, delete "method" and insert -- apparatus --, therefor.

Column 10, line 19, Claim 20, delete "method" and insert -- apparatus --, therefor.

Signed and Sealed this
Ninth Day of February, 2016

Michelle K. Lee
*Director of the United States Patent and Trademark Office*